(12) United States Patent
Braun et al.

(10) Patent No.: US 6,640,783 B2
(45) Date of Patent: Nov. 4, 2003

(54) COMPOSITE FUEL RAIL WITH INTEGRAL DAMPING AND A CO-INJECTED NON-PERMEATION LAYER

(75) Inventors: Charles W. Braun, Livonia, NY (US); Gary J. DeAngelis, Spencerport, NY (US); Ahmet T. Becene, Rush, NY (US); Steven J. Fogarassy, Webster, NY (US); Brent J. Wahba, Honeoye Falls, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/027,453

(22) Filed: Dec. 21, 2001

(65) Prior Publication Data

US 2002/0108660 A1 Aug. 15, 2002

Related U.S. Application Data

(60) Provisional application No. 60/269,135, filed on Feb. 15, 2001.

(51) Int. Cl.$^7$ .............................................. F02M 37/04
(52) U.S. Cl. ........................ 123/467; 123/456; 138/125; 264/241
(58) Field of Search .............................. 123/467, 456, 123/468, 469, 470, 472; 138/125, 140, 141, 145; 264/219, 225, 240, 241

(56) References Cited

U.S. PATENT DOCUMENTS

| | | | | |
|---|---|---|---|---|
| 4,660,524 A | * | 4/1987 | Bertsch et al. | 123/468 |
| 5,056,489 A | * | 10/1991 | Lorraine | 123/468 |
| 5,170,011 A | * | 12/1992 | Martucci | 174/47 |
| 5,617,827 A | | 4/1997 | Eshleman et al. | |
| 5,752,486 A | * | 5/1998 | Nakashima et al. | 123/467 |
| 5,884,607 A | * | 3/1999 | Schiller et al. | 123/467 |
| 6,148,798 A | | 11/2000 | Braun et al. | |
| 6,354,273 B1 | * | 3/2002 | Imura et al. | 123/467 |
| 6,398,059 B1 | * | 6/2002 | Hayashi et al. | 220/562 |

* cited by examiner

*Primary Examiner*—Carl S. Miller
(74) *Attorney, Agent, or Firm*—Patrick M. Griffin

(57) ABSTRACT

The present invention generally includes a composite fuel rail with integral damping provided by flat sections, molded into the rail conduit, that flex in response to a pressure pulsation and a co-injected composite laminate structure wherein the compounds of the laminates can be selectively varied to provide impact resistance, chemical resistance and a vapor permeation barrier, as needed.

16 Claims, 3 Drawing Sheets

COMPOSITE FUEL RAIL WITH INTEGRAL DAMPING AND A CO-INJECTED NON-PERMEATION LAYER

CROSS-REFERENCE TO RELATED APPLICATIONS

This application claims the benefit of U.S. Provisional Patent Application Ser. No. 60/269,135, filed Feb. 15, 2001.

TECHNICAL FIELD

The present invention relates to an internal combustion engine fuel injection system and, more particularly, to a fuel injection system having a laminated fuel rail made of composite materials with integral pressure damping.

BACKGROUND OF THE INVENTION

Modern automotive fuel systems typically employ fuel injectors that control the flow of fuel to each of the engine's cylinders. Fuel injected engines require a high-pressure fuel feed upstream of the fuel injector that produce system pressures in the range of 300–450 kPa. It is most desirable for the flow of fuel to the cylinders to be carefully controlled for optimal fuel economy and performance, and to minimize emissions from the combusted fuel. Fuel enleanment to the cylinders and cylinder-to-cylinder maldistribution can occur when fuel flow is not carefully controlled. Fuel enleanment (not enough fuel delivered to the cylinder) occurs when the amplitude of fuel pressure pulsations measured in the fuel rail varies with engine speed. This has the effect of changing the average fuel pressure while the injector is open, thereby changing the fuel flow for the same commanded injector on time. Cylinder-to-cylinder maldistribution (uneven apportionment of fuel between cylinders) occurs when the pressure oscillations at the injectors differ from one cylinder to the next during the injector event under constant engine speed and load. The resulting difference in average fuel pressure during the injector event causes variations in cylinder-to-cylinder fuel delivery. Either of these conditions (enleanment or maldistribution) can cause higher emission levels, rough engine operation and a loss in fuel economy.

A typical fuel injection system incorporates a plurality of injectors for delivery of fuel to the inlet ports of the engine. The injectors are mounted in a fuel rail that not only delivers fuel under high pressure to the injectors, but positions each injector in close proximity to either an associated intake manifold runner or its associated intake valve. Most fuel injected engines use electromagnetic fuel injectors which deliver the fuel in metered pulses that are timed to provide the amount of fuel needed for the specific engine operating conditions. Each injector is programmed to pulse or open every other revolution of the engine crankshaft. During an injector opening event, the measured fuel pressure in the fuel rail can instantaneously drop by more than 30 kPa, then increase by more than 50 kPa after the injector closes.

For a typical four cylinder engine operating at 2000 RPMs, the combined injectors pulse at a rate of 66 pulses per second. In such injector-based systems, these pulses cause high frequency pressure waves of significant amplitude to propagate through the fuel rail(s) which, in turn, cause fuel delivery to be compromised as described above and/or fuel line vibration and noise known as "line hammer" to occur. Fuel line hammer occurs when the pressure pulsations excite a fuel line or other connected hardware causing it to move or vibrate. The vibrations can be amplified and transmitted into the passenger compartment by body panels or other structural members of the vehicle. The resulting noise, often heard as a "ticking" sound, can be mistaken for lifter or injector noise which may be perceived as poor engine quality. Therefore, a damping system is needed to reduce the pressure pulses and vibrations that occur.

Early fuel injection systems were of the fully recirculating type with a high pressure pump in the tank, a spring diaphragm fuel pressure regulator mounted at the fuel rail and a fuel return line running from the rail back to the tank. In this type of system fuel is pumped from the fuel tank to the fuel rail. Excess fuel not injected by an injector is "bypassed" back to the fuel tank via the return line. The pressure regulator controls the fuel pressure by varying the flow orifice size between operating pressure in the rail and the low-pressure return line. A side benefit of this type of architecture is that the regulator also provides compliance or damping to the fuel system. In most recirculating systems the regulator is the only component needed to absorb the pressure pulsations found in the system. The negative aspect of a recirculating system is that the return fuel carries heat and fuel vapors back to the fuel tank that can be detrimental to the control of evaporative emissions.

To reduce the transfer of undesirable heat and vapor back to the fuel tank some auto manufacturers have relocated the regulator from the fuel rail to the fuel tank and eliminated the return fuel line. In these types of systems, known as "demand" or "returnless" fuel systems, only the fuel required for engine operation is sent forward from the fuel tank. This effectively eliminates the heat and vapor source from the returning fuel. However, with the regulator in the tank, the beneficial effect of damping out pressure pulsations in the fuel rail is lost. To replace the lost damping in returnless fuel systems, dedicated dampers have been added to or near the fuel rail.

One such pressure-damping device is a spring diaphragm, similar to a regulator, attached to the fuel rail or the fuel supply line. The spring diaphragm operates to reduce pressure pulsations which can cause fuel metering error and audible operating noise produced by the injector pressure pulsations. One acknowledged problem with the spring diaphragm is that it provides only point damping and can lose function at low temperatures. Other problems associated with the use of the spring diaphragm are that it complicates the rail or fuel line, adds more joints susceptible to leakage, can permeate hydrocarbons through the diaphragm, necessitates additional hardware cost, and in many cases does not provide adequate damping.

Another device known in the art is an internal rail damper such as that disclosed in U.S. Pat. No. 5,617,827 (Eshleman et al.). Two shell halves are welded together to form a damper having a sealed airspace filled with trapped air disposed between two compliant sidewalls. The shell material must be hermetically sealed and impervious to gasoline. These shells or volumes have relatively large flat or nearly flat sides that flex in response to rapid pressure spikes in the fuel system. The flexing absorbs the energy of the pressure spikes and reduces the wave speed of the resultant pressure wave thereby reducing the amplitude of the pressure spikes during injector firing events. The internal rail damper needs to be positioned in the fuel rail so as to not adversely affect the flow of fuel to the associated injectors. Although internal dampers have excellent damping properties, a known disadvantage is that it requires the use of end supports to properly position the dampers. These support structures are often difficult and expensive to make due to the intricate slots, grooves and keys required to receive the damper and maintain proper positioning. Also, the fuel rail itself must be specially designed to accommodate the support structures and damper. This may lead to larger fuel rails than are otherwise needed. Other disadvantages include additional assembly time and the further expense of rail end plugs and o-rings.

U.S. Pat. No. 4,660,524 (Bertsch et al.) discloses a metal fuel rail having flat, flexible walls. The flexing fuel rail is provided with large flat surfaces, designed to flex in response to rapid pressure spikes in the fuel system. As pressure pulses occur, the elastic walls function to dampen the pressure pulsations. Flexing fuel rails as disclosed in Bertsch et al. are generally triangular or rectangular in cross section and include long flat sections in one or two side walls of the structure that react to one frequency of pressure pulsation. A rigid wall section to which the mounting hardware and injectors are necessarily affixed accompanies the flexing wall. The fuel rail disclosed in Bertsch et al. limits the rail's cross section expansion volume. Moreover, because of its welded metal construction, the expansion frequency of the rail cannot be readily tuned to optimize absorption of pressure spikes and to minimize vibration. In addition, the disclosed stainless steel construction is expensive to manufacture. Stainless steel parts require additional processing steps such as stamping, sub-welding, brazing, metal finishing, pasting and processing in a furnace.

In view of the current state of the prior art technology, there exists a need for a molded composite fuel rail formed in an open cross sectional shape having at least one flexible wall whereon stiffener features can be molded to readily tune the absorption characteristics of the fuel rail as needed. Moreover, what is needed is a composite fuel rail that can be molded in laminated layers wherein materials can be selected to add toughness to the design and resistance to alcohol based fuels, and to provide a barrier to keep fuel vapors from permeating through the fuel rail walls.

SUMMARY OF THE INVENTION

The present invention generally includes a composite fuel rail with integral damping provided by large flat sections, molded into the rail conduit, that flex in response to pressure pulsations. As an alternate embodiment, the composite fuel rail can be of a laminate construction of different polymer compounds to provide impact resistance, chemical resistance and a permeation barrier as needed for a particular application. Notwithstanding the ability of the composite material to better absorb noise energy as compared to a metal fabricated rail, the present invention also permits molded ribs to be strategically placed along the outer surface of the rail to tune the rail to a particular engine application.

The invention in its broadest aspect comprises an apparatus composite fuel rail with integral damping.

A general aspect of the present invention is to provide a co-injected composite laminate structure that includes impact resistance, chemical resistance and a permeation barrier.

Another aspect of the present invention is to provide a fuel rail with large elastic flat sections molded into the conduit that dampen pressure pulsations with a rigid strengthening rib on which the supports and injector ports are disposed.

Still another aspect of the present invention is to provide a fuel rail that can be tuned to multiple frequencies so that the rail cannot be excited by one frequency.

Still a further aspect the present invention is to provide a fuel rail that reduces audible noise and line hammer without having to add an external dampening system.

These and aspects, features and advantages of the present invention will become readily apparent to those having ordinary skill in the art upon a reading of the following detailed description in view of the appended claims and drawings.

BRIEF DESCRIPTION OF THE DRAWINGS

The nature and mode of operation of the present invention will now be more fully described in the following detailed description in view of the accompanying drawings wherein.

DESCRIPTION OF THE PREFERRED EMBODIMENT

Figure 1:
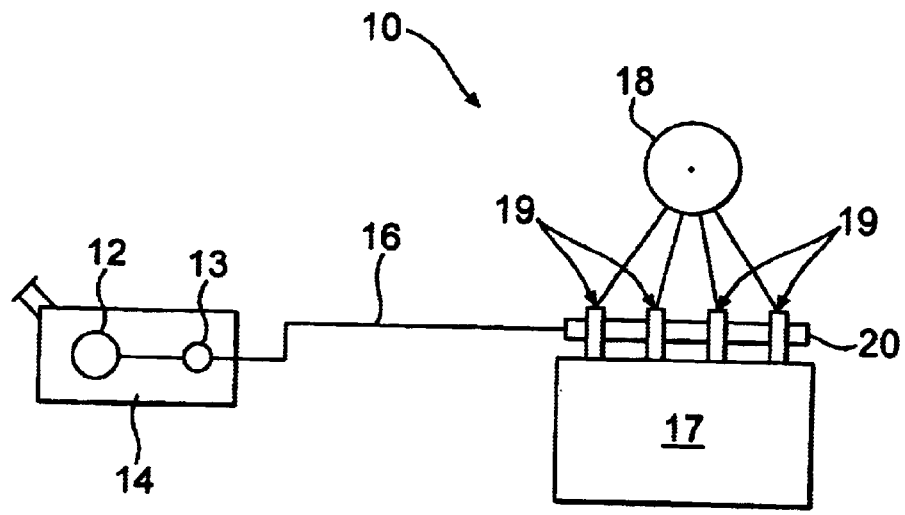
FIG. 1 is a schematic depiction of a returnless fuel system.

Referring to FIG. 1, a returnless fuel system is shown. Returnless fuel system 10 includes high pressure fuel pump 12 and pressure regulator 13 disposed inside fuel tank 14. Regulator 13 is in fluid communication with pump 12. Fuel feed line 16 connects to regulator 13 to supply fuel under pressure to fuel rail 20 for distributing fuel to engine combustion chambers (not shown) of internal combustion engine 17. Fuel injectors 19 are fluidly connected to fuel rail 20. The injectors receive electrical signals from ECM 18 to disperse controlled amounts of fuel into the combustion chambers as readily known in the art.

Figure 2:
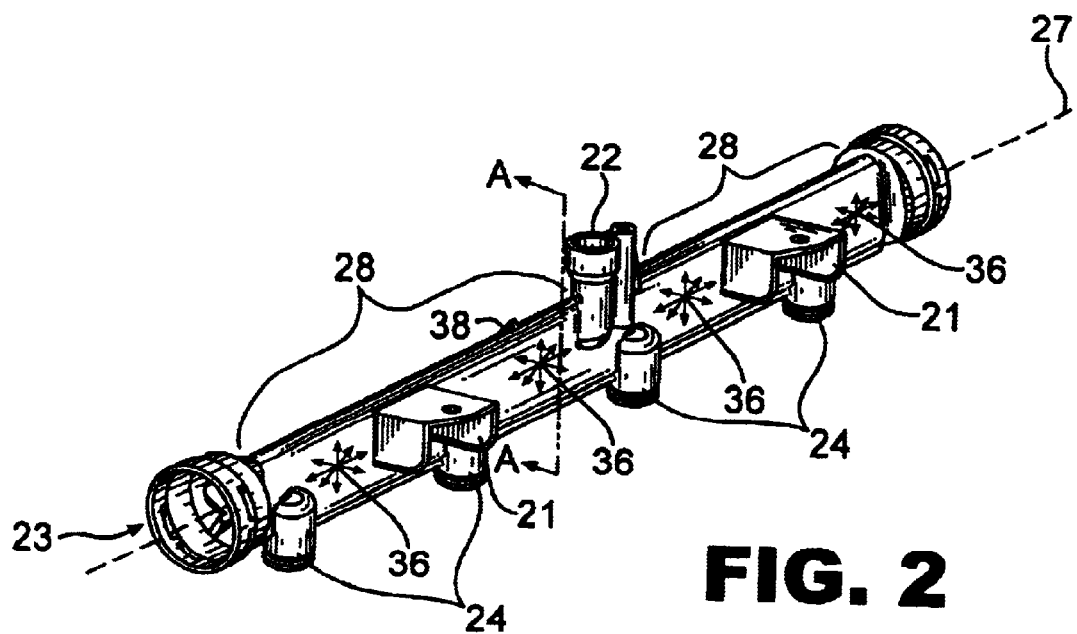
FIG. 2 is a perspective view of a fuel rail of the present invention.

FIG. 2 illustrates composite fuel rail 20 of the present invention in greater detail. Fuel rail 20 includes fuel inlet 22 and a plurality of fuel injector ports 24 coupled to the fuel rail for mechanically receiving fuel injectors 19. Attachment bosses 21 are used to secure the fuel rail to the engine using suitable fasteners, such threaded fasteners or clips, as known in the art. Rail end openings 23 are sized to receive end plugs (not shown) to seal the rail ends from fuel leakage. As an alternative, at least one rail end can be formed as a closed end during the injection molding process. While the fuel rail illustrated shows a bank of four injector ports, it is understood that any number of injector ports can be provided to correspond to the number of cylinders for the particular engine application. Also, while the fuel rail depicted in the drawings is shown having a triangular cross section, it is understood that the rail's cross section of the preferred embodiment can be of any geometric cross section having at least one flexible flat wall in its construction, as will now be discussed. In addition, fuel rail 20 is preferably formed from one or more polymer materials by an injection molded process that will also be discussed in further detail below.

Figure 3:
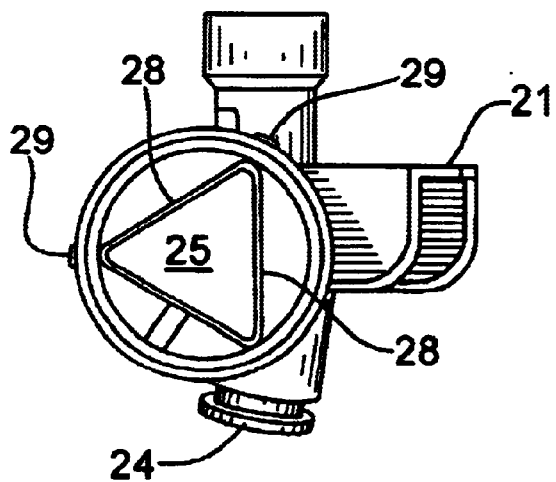
FIG. 3 is cross sectional end view of the present invention taken generally along A—A in FIG. 2.
Figure 6:
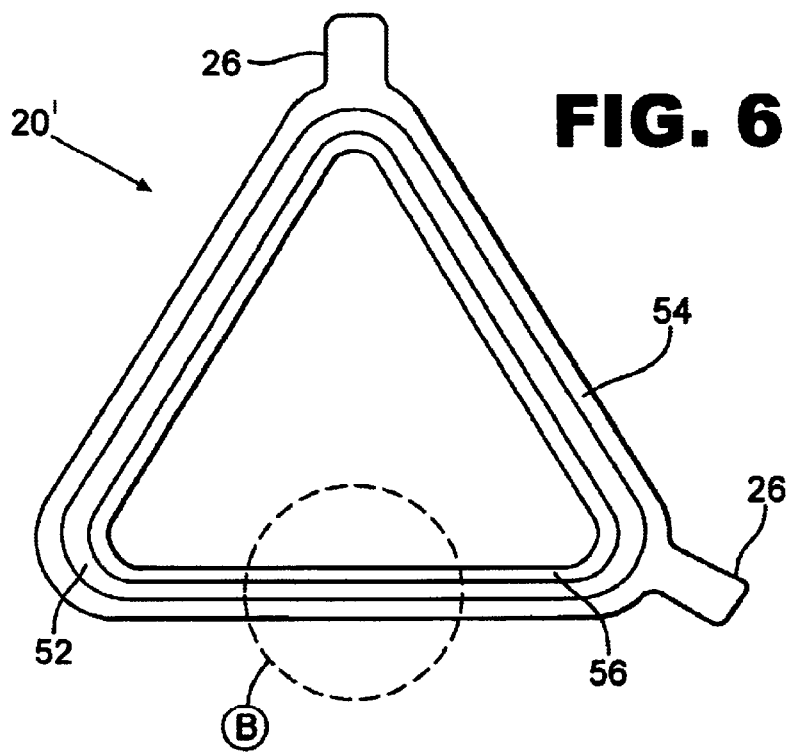
FIG. 6 is a cross sectional end view of the fuel rail illustrating the laminate construction.

As shown in FIGS. 2 and 3, fuel rail 20 includes a longitudinal fuel flow passage 25, having a substantially triangular cross section defined by flat wall sections 28 and edges 29. Fuel injector ports 24 fluidly communicate with fuel inlet 22 via passage 25. Fuel injectors (not shown in FIGS. 2 and 3) are sealably fitted into fuel injector ports 24 and are in turn, sealably fitted into intake manifold runners (not shown) or directly into combustion chambers (not shown) as known in the art. In use, each injector is electrically energized by signals from ECM 18 as required by the operating demands of engine 17. Fuel entering fuel rail 20 through fuel inlet 22 is thereby distributed to the fuel injectors through injector ports 24 and is injected into the respective combustion chambers in metered pulses by the sequential energization of the fuel injectors as commanded by ECM 18. Longitudinal ribs 26, as best shown in FIG. 6, oriented at edges 29 and generally parallel to longitudinal axis 27 of fuel rail 20, maintain the shape of the fuel rail in the molding process and serve to strengthen the entire rail during operation of the fuel delivery system. As illustrated in FIG. 2, injector ports 24 are substantially connected to fuel rail 20 by edges 29 proximate longitudinal ribs 26. This construction allows for an increased area of flat wall sections 28 for damping of fuel pressure pulses in rail 20, as will now be discussed.

Figure 4:
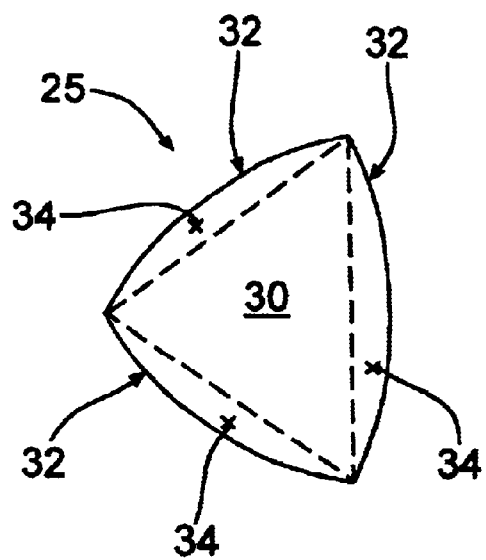
FIG. 4 is a simplified view of a cross section of a triangular conduit showing the increase of the rail's cross-sectional area with walls flexed.

FIG. 4 illustrates a simplified cross section of triangular fuel flow passage 25 defined by flat wall sections 28 and edges 29. Triangular cross section 30 depicts the shape of fuel flow passage 25 of composition fuel rail 20 when the fuel system is at rest (no fuel pump pressure). As pressure waves induced by high pressure fuel pump 12 in conjunction with the pulsating of injectors 19 travel within fuel rail 20, wall sections 28 flex outward, as shown by numeral 32, thereby increasing the area of cross section 30 by an amount collectively shown as numeral 34. This increases the flow area of flow passage 25 and decreases the natural frequency of the fuel system resulting in a substantial reduction in the amplitude of the pressure pulses in rail 20. The suitable thickness of wall sections 28 depends substantially on the polymer compound used to form the fuel rail, the fuel pump pressure and the particular fuel injector calibration. Optimal thickness of the wall sections, preferably in the range of 2.0–3.0 mm., may be determined readily without undue experimentation by one of ordinary skill in the art. While the depicted triangular shape lends itself well to molding and, for the same amount of wall flexing, provides a greater percentage increase in cross sectional area, as compared to a fuel rail having a rectangular or square cross section, it is understood that any geometric cross section having at least one flat wall section can be used.

The interruptions in the damping surfaces caused by features integrally molded into the wall sections 28, such as attachment bosses 21, fuel inlet 22, and injector ports 24, create active damping surfaces of different geometry (length, width). These different geometries (shown as numeral 36 on FIG. 2) have their own natural vibration frequencies. The different natural frequencies of the geometrically different sections make it unlikely for the entire rail to be excited by one frequency, and therefore reduce the audible noise generated by the rail's external damping surfaces.

Figure 5:
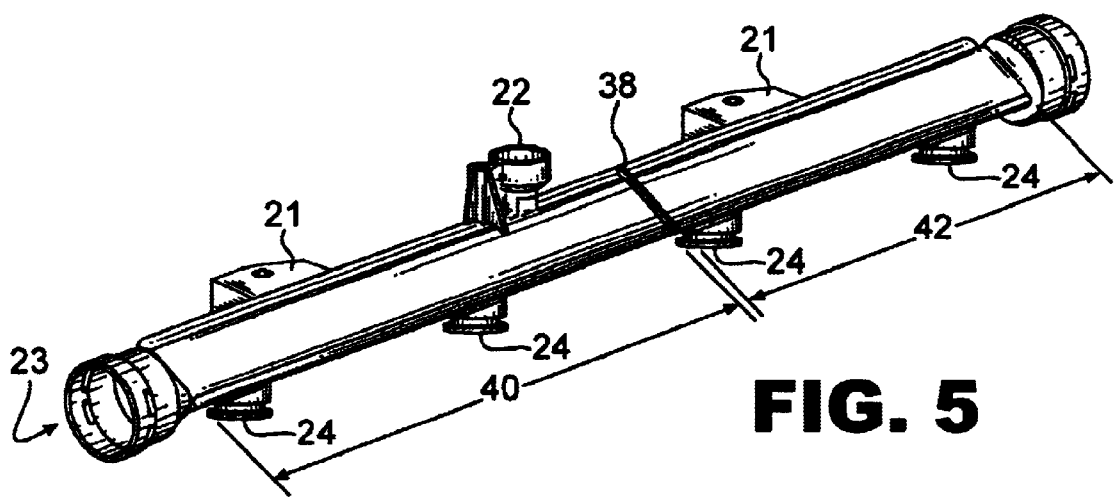
FIG. 5 is a perspective view of the present invention with a stiffening rib affixed along a flat section.

The natural frequencies of each flat wall sections 28 can be further tuned to vibrate at select frequencies by molding in stiffening ribs 38 in strategic locations. As shown in FIG. 5, one or more stiffening ribs 38 can be placed in locations along flat wall sections 28 so that no one frequency can excite the entire fuel rail. In one embodiment the ribs can be placed so that flat portions 40 and 42 are geometrically unequal. In another embodiment the flat surfaces of the fuel rail can be tuned by the placement of ribs 38 such that their fluid borne pulsations are out of phase negating one another. The strategic placement of integrally molded features (bosses, ports and inlets) and of integrally molded ribs may be determined readily for specific engine applications without undue experimentation by one of ordinary skill in the art.

Preferably, fuel rail 20 is formed of a thermoplastic polymer having a relatively high melting temperature, for example, a glass-filled poly amide (PA). The PA material has been found to be highly moldable, tough and durable and, under most applications, impervious to a fuel and oil environment. However, in some cases, it has been found that fuel vapors can permeate through the PA material. Moreover, the PA material may be unsuitable for use with fuels having a high alcohol content. For high alcohol content fuels, and for applications where permeation of hydrocarbon vapors through the molded material is unacceptable, the present invention offers a solution.

Fuel rail 20' (FIG. 6) is made of a co-injected composite laminate structure that provides impact resistance, resistance to alcohol and a permeation barrier. Within composite wall 50 of the fuel rail, a laminate barrier 52 is sandwiched between outer laminate 54 and inner laminate 56.

Figure 7:
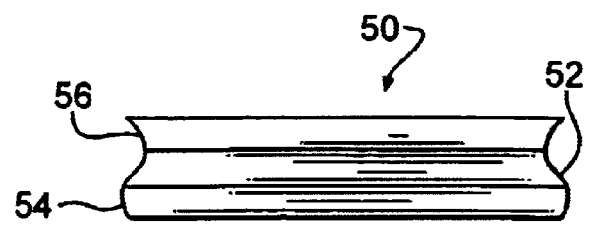
FIG. 7 is an enlarged view of a cross section of the fuel rail wall shown in section B of FIG. 6, illustrating the three layers of the fuel rail.

FIG. 7 is a magnified view of fuel rail 20' shown as view B of FIG. 6. The present invention provides an efficient method of co-injection to form the laminate barrier 52 between outer laminate 54 and inner laminate 56 of composite wall 50 that defines fuel flow passage 25. In a preferred embodiment, the co-injection method comprises a two-shot plastic injection molding process utilizing a conventional injection mold. Co-injection molding takes advantage of a characteristic of injection molding called fountain flow. That is, as the cavity is filled, the plastic at the melt front moves from the center line of the stream to the cavity walls. Because the walls are below the transition temperature (freeze temperature) of the melt, the material that touches the walls cools rapidly and freezes in place. The plastic material comprising outer laminate 54 and inner laminate 56 is injected into the mold first, then the plastic material comprising laminate barrier 52 is injected. The material comprising laminate barrier 52 thereby displaces the hot core of the material comprising the outer and inner laminates 54, 56. After allowing the molded fuel rail structure to cool and fully solidify, the end product is a sandwich-like structure, with barrier laminate 52 in the middle and outer and inner laminates 54, 56 forming the outer and inner surfaces of wall 50.

The specific compounds used for the inner and outer laminates 54, 56 and the barrier laminate 52 can be any combination of thermoplastic material suitably configured and adapted to form a fuel rail. For example, a PA material can be used to form the outer and inner laminates 54, 56 to give the rail its overall toughness and durability. Laminate barrier 52 can be formed from a polymer known for its non-permeability characteristics and its resistance to alcohol such as, for example a poly phthalamide (PPA). Conversely, depending on the application, the polymers identified above can be reversed in the injection molding process. Other materials can be selected for either the laminate barrier or the inner/outer laminate such as, for example, liquid crystal polymer (LCP), poly phenylene sulfide (PPS), polyether ether ketone (PEEK), impact modified poly amide (PA), polyesters (PBT; PET) or poly oxymethylene (POM), for their thermal conductivity characteristics, permeability, weight savings, color, and durability according to the particular needs of the application.

As will be appreciated, the present invention provides an injection-molded rail designed to provide the unique functions of damping and low permeation integral to a single piece molded rail conduit. It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings, shall be interpreted as illustrative and not in a limiting sense. It is also to be understood that the following claims are intended to cover all the generic and specific features of the invention herein described, and all statements of the scope of the invention that, as a matter of language, might be said to fall therebetween.

What is claimed is:

1. A composite fuel rail for supplying fuel to at least one fuel injector comprising:
   a) a plurality of elongated walls having at least one flat wall section defining a generally hollow fuel flow passage, said at least one flat wall section having a damping surface;
   b) a longitudinally extending open cross section, whereby said damping surface of at least one flat wall section is operatively arranged to flex in response to pressure pulsations; and
   c) a means for tuning said fuel rail to a specific frequency in response to said pressure pulsations, wherein means for tuning comprises the placement of at least one feature in at least one of said at least one flat wall section such that said dampening surface is interrupted, and wherein said at least one feature is selected from the group consisting of attaching bosses, at least one longitudinal rib, and at least one stiffening rib.

2. The composite fuel rail of claim 1, wherein said fuel rail is formed of deformable polymer.

3. The composite fuel rail of claim 2, wherein said deformable polymer is PA.

4. The composite fuel rail of claim 2, wherein said at least one flat wall section comprises an inner laminate, a laminate barrier, and an outer laminate and at least one of said inner laminate, laminate barrier, and outer laminate is formed from a material selected from the group consisting of PA, PPA, LCP, PPS, PEEK, PBT, PET, and POM.

5. The composite fuel rail of claim 4, wherein said inner laminate and said outer laminate are formed of PA and said laminate barrier is formed of PPA.

6. The composite fuel rail of claim 1, wherein said open cross section is triangular.

7. The composite fuel rail of claim 1, wherein said at least one stiffening rib is positioned on said at least one flat wall section to form a first flat portion and a second flat portion.

8. A method of forming a composite fuel rail, the method comprising:
   a) preparing a mold cavity configured to a desired fuel rail shape;
   b) injecting a first thermoplastic polymer into said mold cavity and allowing said first thermoplastic polymer to form a skin layer at the mold surface while maintaining a molten center;
   c) injecting into said molten center a second thermoplastic polymer of different composition from said first thermoplastic polymer to form a molded structure; and
   d) allowing the molded structure to cool and solidify resulting in a laminate rail structure.

9. A method according to claim 8 wherein said first thermoplastic polymer is PA and said second thermoplastic polymer is selected from the group consisting of PPA, LCP, PPS, PBT, PET, and POM.

10. A method according to claim 8 wherein said first thermoplastic polymer is selected from the group consisting of PPS, LCP, and PEEK and said second thermoplastic polymer is PA.

11. A composite fuel rail for supplying fuel to at least one fuel injector comprising:
    a) a plurality of elongated walls having at least one flat wall section defining a generally hollow fuel flow passage, said at least one flat wall section having a damping surface;
    b) a longitudinally extending open cross section, whereby said damping surface of at least one flat wall section is operatively arranged to flex in response to pressure pulsations; and
    c) a means for tuning said fuel rail to a specific frequency in response to said pressure pulsations, wherein at least one rib is placed in at least one of said at least one flat wall section such that said damping surface is interrupted.

12. The composite fuel rail of claim 11, wherein said fuel rail is formed of deformable polymer.

13. The composite fuel rail of claim 12, wherein said deformable polymer is PA.

14. The composite fuel rail of claim 12, wherein said at least one flat wall section comprises an inner laminate, a laminate barrier, and an outer laminate and at least one of said inner laminate, laminate barrier, and outer laminate is formed from a material selected from the group consisting of PA, PPA, LCP, PPS, PEEK, PBT, PET, and POM.

15. The composite fuel rail of claim 14, wherein said inner laminate and said outer laminate are formed of PA and said laminate barrier is formed of PPA.

16. The composite fuel rail of claim 11, wherein said open cross section is triangular.

* * * * *